Patented Apr. 30, 1929.

1,711,008

UNITED STATES PATENT OFFICE.

WILHELM BAUER AND ALFRED HERRE, OF OPLADEN, NEAR COLOGNE, AND ALBERT FUNKE, OF HOCHST-ON-THE-MAIN, GERMANY, ASSIGNORS TO GRASSELLI DYE-STUFF CORPORATION, OF NEW YORK, N. Y., A CORPORATION OF DELAWARE.

READILY-SOLUBLE VAT COLOR PREPARATIONS.

No Drawing. Application filed November 29, 1924, Serial No. 752,936, and in Germany December 10, 1923.

We have invented certain new and useful improvements in readily soluble vat color preparations.

This invention relates to the production of vat color preparations which dissolve readily in water with simultaneous formation of the leuco compounds. The solid, dry vat color preparations also form part of the present invention.

The constant increase of the use of the vat colors for dyeing exceedingly fast shades on vegetable or animal fibres is somewhat hampered by complications in the method of applying these colors to the fibre. The dyestuffs have to be brought into a soluble form by treating same in aqueous suspension with a reducing agent at sometimes high temperature, whereas the preparations which form the subject of this invention are readily soluble in cold or, at the most, in luke warm water and can be used as easily as direct cotton colors.

We have found if water insoluble vat colors are treated with a dispersing agent, the dyestuffs are transformed into a comminuted form, which allows them to react instantaneously with the reducing agent in presence of cold water to form the easily soluble leuco compounds. Amongst the compounds which display such a dispersing action, we have found to be very active certain salts of sulfonic acids, i. e., the sulfonic acid salts of unsaturated fatty acids, salts of lignine sulfonic acids, waste sulfite cellulose liquor, furthermore, easily soluble carbohydrates which might also have a reducing effect such as glucose, dextrine, etc. can be used. One form of practicing our invention is to mix the insoluble dyestuff with caustic alkali solution and an alkali metal salt of a dispersing sulfonic acid and evaporate the reaction product to dryness. The resulting powder is then intimately mixed with a hydrosulfite preparation. The solid preparations obtained in this way are perfectly stable and most readily dissolve when moistened with water.

Alternatively the new preparations may be obtained as follows: The insoluble dyestuffs are treated in suspension with the dispersing salt with an eventual addition of free alkali; the finely comminuted color is filtered off, dried and intimately mixed with a reducing agent and eventually the necessary adjuvants as, for instance free alkali, when using alkali metal hydrosulfite as a reducing agent.

This process possesses the advantage over that first described that solid or pasty vat color preparations are obtained which are of higher strength in consequence of the absence of the sulfonic acid salts. The removal of the dispersing agent is also of advantage in so far as the dispersing agent may be chosen without consideration of any undesirable effect it may exercise in the vat, in which it is, of course, no longer present.

The following specific examples will further illustrate the invention, but it is understood that the invention is not limited to the vat colors mentioned, nor to the specific dispersing or reducing agents used. The parts are by weight.

*Example 1.*—10 parts of 2-(4'-chloranilido) 1-4-naphthoquinone are intimately mixed with 5 parts of monopole soap (sulfonated castor oil) dissolved in a little water and 14 parts of caustic soda solution of 40° Bé. and evaporated to dryness in the absence of air. The product obtained is then ground with the addition of 8 parts of hydrosulfite powder. The preparation thus obtained, on being covered with water, dissolves immediately and can be used for dyeing without further additions.

*Example 2.*—10 parts dianilido-quinone are added to a solution of 4 parts monopole soap in water and are stirred with 20 parts of caustic soda solution of 40° Bé. The mass is then dried in vacuum. The dried product is then well mixed with 7 parts of hydrosulfite powder. The preparation thus obtained dissolves easily when covered with water.

*Example 3.*—20 parts of di-(p-chloranilido)-benzoquinone in the form of a 50% paste are stirred up in 50 parts of water and mixed with 2 parts of monopole soap and 3 parts of soda solution of 40° Bé. This mixture is heated for some time at 60° C. and the dyestuff is then filtered off. The loose powder obtained is finally mixed intimately with 7 parts of caustic soda and 7 parts hydrosulfite powder and the mixture is made up into a paste.

We claim:

1. The process of producing dry readily soluble vat color preparations which comprises treating di-(p-chloro-anilido) benzoquinone with a dispersing agent and an alkali in the presence of water, drying the mixture and mixing therewith a reducing agent which is capable of reducing the insoluble vat color to its leuco form.

2. The process of producing readily soluble vat color preparations which comprises treating di-(p-chloro-anilido) benzoquinone with a dispersing agent and an alkali in the presence of water, separating the solids from the mixture and mixing therewith a reducing agent capable of reducing the insoluble vat color to its leuco form.

3. The process of producing readily soluble vat color preparations which comprises treating di-(p-chloro-anilido) benzoquinone with a dispersing salt of a sulfonated unsaturated fatty acid in the presence of water, separating the solids from the mixture and mixing therewith an alkali and a hydrosulfite.

4. As a new product, the readily soluble vat color preparation consisting of a mixture of a reducing agent capable of reducing insoluble vat colors to their leuco form, an alkali and di-(p-chloro-anilido) benzoquinone dispersed by the action of a dispersing agent.

5. As a new product, the readily soluble vat color preparation consisting of a mixture of hydro-sulfite, an alkali and di-(p-chloro-anilido) benzoquinone dispersed by the action of a salt of a sulfonated unsaturated fatty acid.

6. The process of preparing dry readily soluble vat dyestuff preparations which comprises treating an insoluble vat dyestuff with a dispersing agent in the presence of water, drying the mixture and mixing therewith a reducing agent which is capable of reducing insoluble vat dyestuff to its leuco form.

7. The process of preparing dry readily soluble vat dyestuff preparations which comprises treating an insoluble vat dyestuff with an alkali and a dispersing salt of a sulfonic acid in the presence of water, drying the mixture and mixing therewith a reducing agent which is capable of reducing the insoluble vat dyestuff to its leuco form.

8. The process of preparing dry readily soluble vat dyestuff preparations which comprises treating an insoluble vat dyestuff with an alkali and a dispersing salt of a sulfonated unsaturated fatty acid in the presence of water, drying the mixture and mixing therewith a reducing agent which is capable of reducing the insoluble vat dyestuff to its leuco form.

9. The process of preparing dry readily soluble vat dyestuff preparations which comprises treating an insoluble vat dyestuff with an alkali metal salt of a sulfonated unsaturated fatty acid in the presence of water, drying the mixture and mixing therewith an alkali and a hydrosulfite.

10. The process of preparing readily soluble vat dyestuff preparations which comprises treating an insoluble vat dyestuff with a dispersing agent in the presence of water, separating the solids from the mixture, and mixing therewith a reducing agent which is capable of reducing the insoluble vat dyestuff to its leuco form.

11. The process of preparing readily soluble vat dyestuff preparations which comprises treating an insoluble vat dyestuff with an alkali and a dispersing salt of a sulfonic acid in the presence of water, separating the solids from the mixture, and mixing therewith a reducing agent which is capable of reducing the insoluble vat dyestuff to its leuco form.

12. The process of preparing readily soluble vat dyestuff preparations which comprises treating an insoluble vat dyestuff with an alkali and a dispersing salt of a sulfonated unsaturated fatty acid in the presence of water, separating the solids from the mixture, and mixing therewith a reducing agent which is capable of reducing the insoluble vat dyestuff to its leuco form.

13. The process of preparing readily soluble vat dyestuff preparations which comprises treating an insoluble vat dyestuff with a dispersing salt of a sulfonated unsaturated fatty acid in the presence of water, separating the solids from the mixture and mixing therewith an alkali and a hydrosulfite.

14. As a new product a readily soluble vat dyestuff preparation comprising a dispersed insoluble vat dyestuff and a reducing agent which is capable of reducing the insoluble vat dystuff to its leuco form.

15. As a new product a readily soluble vat dyestuff preparation comprising a dispersed insoluble vat dyestuff, an alkali and a reducing agent which is capable of reducing the insoluble vat dyestuff to its leuco form.

16. As a new product a readily soluble vat dyestuff preparation comprising a dispersed insoluble vat dyestuff, a dispersing sulfonic acid salt, an alkali and a reducing agent which is capable of reducing the insoluble vat dyestuff to its leuco form.

17. As a new product a readily soluble vat dyestuff preparation comprising a dispersed insoluble vat dyestuff, a salt of a sulfonated unsaturated fatty acid, an alkali and a reducing agent which is capable of reducing the insoluble vat dyestuff to its leuco form.

18. As a new product a readily soluble vat dyestuff preparation comprising a dispersed insoluble vat dyestuff, a salt of a sulfonated unsaturated fatty acid, an alkali and a hydrosulfite.

19. As a new product a readily soluble vat dyestuff preparation comprising a mixture of an insoluble vat dyestuff dispersed by the action of a dispersing sulfonic acid alkali metal salt and an alkali, and a reducing agent which is capable of reducing the insoluble vat dyestuff to its leuco form.

20. As a new product a readily soluble vat dyestuff preparation comprising a mixture of a hydrosulfite, an alkali and an insoluble vat dyestuff dispersed by the action of a dispersing sulfonic acid alkali metal salt and an alkali.

21. As a new product a readily soluble vat dyestuff preparation comprising a mixture of a hydrosulfite, an alkali and an insoluble vat dyestuff dispersed by the action of a salt of a sulfonated unsaturated fatty acid.

In testimony whereof we have hereunto set our hands.

WILHELM BAUER.
ALFRED HERRE.
ALBERT FUNKE.